Nov. 3, 1970

KAZUO MURATA 3,537,902

SEMI-SEALED TYPE STORAGE BATTERY

Filed Aug. 26, 1965

INVENTOR

Kazuo Murata

BY Watson, Cole, Grindle & Watson

ATTORNEYS

INVENTOR
Kazuo Murata

BY Watson, Cole, Grindle & Watson
ATTORNEYS

> United States Patent Office 3,537,902
Patented Nov. 3, 1970

3,537,902
SEMI-SEALED TYPE STORAGE BATTERY
Kazuo Murata, Takatsuki, Japan, assignor to Yuasa Batttery Company Limited, Osaka Prefecture, Japan
Filed Aug. 26, 1965, Ser. No. 482,743
Claims priority, application Japan, Oct. 29, 1964, 39/84,773
Int. Cl. H01m 1/06, 35/00
U.S. Cl. 136—6     3 Claims

ABSTRACT OF THE DISCLOSURE

A leak-proof battery is described having an exhaust port containing a microporous synthetic material in the container wall to permit the exhaust gases generated in the battery to escape but prevent escape of the electrolyte. Optionally, a valve which will open in response to internal gas pressure in the battery and an acid absorber may be located on the internal side of the microporous material to further prevent escape of electrolyte. A glass mat or other microporous material serves as a battery separator and also as an envelope surrounding all of the plates.

---

This invention relates to a storage battery, and more particularly it relates to a semi-sealed type storage battery.

An alkaline battery is one of those sealed batteries of a conventional type that are known well for their complete sealing, and such a sealed battery involves danger of explosion due to an increase in the amount of gas produced inside the battery, because it is completely sealed, and consequently it has a disadvantage of being restricted in charge and discharge, and especially it possesses a fatal drawback of charging within a short time being impossible. Besides, the battery of this type is so designed that the active material of the battery absorbs a gas which is produced in time of charging thereby to prevent an increase of pressure within the battery, and hence quality control and process management for maintaining a gas absorption by the active material at a definite rate at all times become all the more difficult. Furthermore, the battery of this type has a defect that because the negative electrode is constantly subjected to surplus capacity, volume efficiency and weight efficiency are inferior to an open type battery. On the other hand, a sealed type battery in which is employed a method of absorbing a gas by the use of the auxiliary electrode has been proposed in the case of a lead acid battery. But it is apt to entail danger of explosion and there is no perfect product yet completed. In addition, a vent plug has been screwed into a cell cover in the case of the open type battery of a conventional type. Such a construction has a disadvantage in that there is not only danger of an electrolyte leaking out of the threaded portion or a gas leaking therefrom catching fire and causing explosion but also a groove appearing on the surface of the battery ruining the appearance of the battery and diminishing the marketability value thereof as a merchandise.

This invention is intended to eliminate all the drawbacks of the kind described.

The primary object of the invention is to provide a semi-sealed type storage battery wherein there is no possibility of an electrolyte leakage and explosion.

Another object of the invention is to provide a compact and light weight semi-sealed type storage battery which is superior in volume and weight efficiency.

Still another object of the invention is to provide a semi-sealed type storage battery which presents an attractive appearance.

This invention will become more apparent from the following description made with reference to the accompanying drawings in which.

Figure 1:
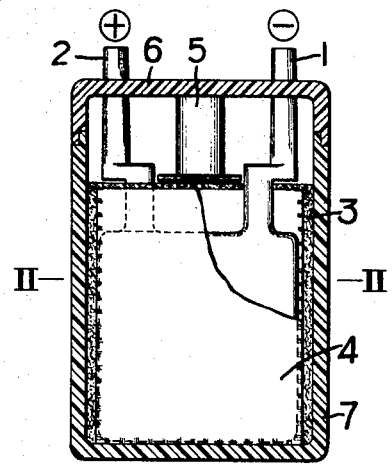
FIG. 1 is a longitudinal sectional view of a semi-sealed storage battery showing an embodiment of this invention in which a cell cover and the microporous material of an exhaust portion provided on the cell cover are completely jointed together into an integral whole.
Figure 2:
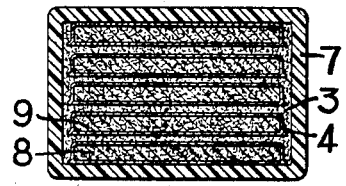
FIG. 2 is a sectional view taken along line II—II of FIG. 1.
Figure 3:
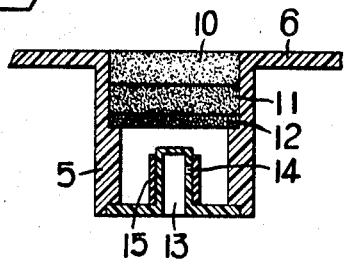
FIG. 3 is an enlarged longitudinal sectional view in part of the exhaust portion provided on the cell cover according to the invention.
Figure 4:
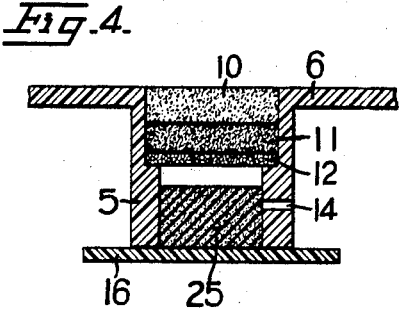
FIG. 4 is a view similar to FIG. 3 but having an exhaust portion on which a fine hole was laterally made and a spongy valve is provided.
Figure 5:
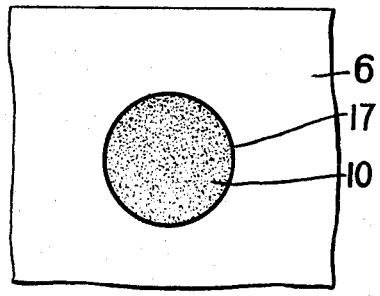
FIG. 5 is a plan view of a semi-sealed type storage battery according to the invention but showing on an enlarged scale a microporous material portion formed integrally with the surface of the cell cover.
Figure 6:
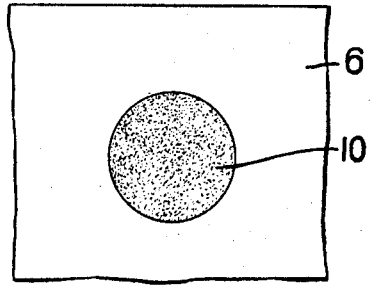
FIG. 6 is a view similar to FIG. 5 but showing a modification of the invention.

Referring now to the drawings and more particularly to FIGS. 1 through 6, this invention comprises arranging alternately in a container 7 made of rectangular electrically insulating material and an elastic separator 4 which is formed of porous synthetic resin with a thickness of 0.1 mm. and which is heat-sealed into an envelope-like shape in which is placed a negative plate 8 having a negative post 1 and a positive plate 9 having a positive post 2, and filling the space between both plates and between the plates and the walls of the container with a porous material such as glass mat 3 holding an electrolyte. The battery and the cell cover 6 of the same shape therewith are placed into tight contact with each other so that the battery may be liquid-proof. To the back of said cover is fixed a vent pipe 5 on which is provided a gas guide pipe 13 having a shoulder and a gas hole 14. Said shoulder is intended to support a glass mat 12, on the top of which a neutralizer 11 is placed and on the top of said neutralizer 11 is further placed a microporous material 10 flush with the surface of the cell cover. Into said gas guide pipe is tightly fitted a tube 15 of rubber or synthetic resin through which the pressure that has been raised inside the battery and that gets out of a through hole 14 forces to expand and flows into the upper chamber of the battery. In an embodiment shown in FIG. 4 a splash plate 16 is fixed to the lower side of a vent pipe 5 for the prevention of splashes from coming direct into the vent pipe. The lower part inside the vent pipe is filled with a spongy material 25 for covering the gas hole.

There are roughly two methods of forming a container and a microporous material into an integral whole.

According to one method, a special mixture including a solvent is poured into an exhaust portion formed on the cell cover and thereafter a volatile matter is removed therefrom, thereby to simultaneously effect the formation of a microporous material and the connection of the microporous matter with the cell cover. The mixture used in the method consists chiefly of resin, a solvent therefor, and a non-solvent therefor, and additionally carbon, pigments, cut fibers, etc. Some examples will be described in the following.

EXAMPLE 1

Five parts of polyvinyl chloride resin was dissolved into 60 parts of tetrahydrofuran. To the solution was added 35 parts of ethyl alcohol, to obtain a uniform liquid mixture. Nine gr. of active carbon powder was added to the mixture and stirred well an thereafter the mixture thus obtained was poured in a thickness of about 5 mm. into the cylindrical cell cover exhaust portion having a diameter of 15 mm. and which was formed of styrol acrylonitrile copolymer and was made to volatilize and dried at normal temperature. The porous material produced in this way had numerous very fine pores with a mean pore diameter of less than ten microns, acquiring the property of gas permeability and water repellency and presented a very fine appearance in that not only ni micropores can be seen by the eye but the exhaust portion and the cell cover were formed into an integral whole. It contributed to improved permeability and good appearance that when the layer of the microporous material was examined in section, not only the diameter of the pores was smaller but the concentration of the resin became higher in proportion as the pores came nearer the surface.

EXAMPLE 2

Five parts of polyvinyl chloride resin was dissolved into 60 parts of tetrahydrofuran. To the solution was added 35 parts of ethyl alcohol, to obtain a uniform liquid mixture. The mixture thus obtained was poured over the neutralizer or the porous sheet in the opening of the exhaust portion and was formed into a layer with a thickness of 0.2 mm.–1 mm. The microporous material thus obtained had very fine pores with a mean pore diameter of less than several mircons and was as effective as that which was obtained by Example 1.

EXAMPLE 3

Four parts of polyvinyl chloride resin and 4 parts of ethylene-vinyl acetate copolymer were dissolved into 62 parts of tetrahydrofuran. Thirty parts of ethyl alcohol was added to the solution, to obtain a uniform liquid mixture. The liquid mixture thus obtained was applied to the exhaust portion of the cell cover according to the processes described in Examples 1 and 2. The microporous material thus produced provide water-repellent and effective, showing better elasticity than that produced according to the processes described in Examples 1 and 2.

EXAMPLE 4

Six point eight parts of polystyrene resin was dissolved into tetrahydrofuran or chloroform and thereafter 1 part of dibutyl phthalate was added to the solution and further 10 parts of ethyl alcohol and 5 parts of n-butyl alcohol were added thereto, to obtain a uniform liquid mixture. The mixture thus prepared was used for the formation of micropores. An effective microporous layer having a mean pore diameter of several microns was formed on the exhaust portion.

In the examples shown above, the concentration of resin was found effective when the resin occupied 2–20% of a liquid mixture for micropore formation and that of non-solvent was effective when the non-solvent occupied 10–50%. The solvent that was found effective for polyvinyl chloride was methyl ethyl ketone, benzene-acetone mixed solvent and a mixture of more than two kinds of said solvent; the solvent effective for polystyrene was carbon tetrachloride, ethylene dichloride, etc.; and alcohols which contained 1–4 carbon atoms were especially effective as a non-solvent.

The method according to the invention consists of pouring the liquid mixture thus prepared into an exhaust portion of the cell cover and connecting the exhaust portion integrally to the cell cover by dissolving part of the surrounding cell cover and simultaneously drying, thereby forming a microporous material in an easy way. The liquid mixture may be poured direct into the opening of the exhaust portion or may be poured so that it may be adhered to a porous sheet placed in the opening. But the use of a porous material by itself can produce a thinner porous layer.

The formation of a microporous material by the method desrcibed above is effected by drying and volatilizing the liquid mixture in such a manner that resin is coagulated in a state of the non-solvent contained in the mixture being dispersed while micropores are being formed and the volatile material contained in the mixture is caused to be volatilized thereby to form micropores on the portion where the non-solvent was dispersed.

The dispersion state of non-solvent and the coagulation state of resin which are the essential point in the formation of a microporous material depend upon the mutual action of qualities of solvent, non-solvent and resin respectively, of which the mixture is composed. All that is required of the mixture is to satisfy the essential point. Almost all kinds of resin soluble in solvent is fit for use, for example, soluble polymer and copolymer such as polymethyl methacrylate, polyacrylonitrile, polyamide, polyurethane, polyvinylidene chloride, vinyl chloridevinylidene chloride copolymer, vinyl acetate-vinylchloride copolymer, polyethylene, polyethylene derivatives, polypropylene, polyvinyl acetate, polycarbonate, nitrocellulose, synthetic rubber. As a non-solvent, those which do not dissolve resin but can be mixed with solvents are recommended. Various kinds of alcohol are generally suitable. The mixture that is thus obtained tends to form micropores by volatilizing the volatile material originally contained therein, but addition of carbon powder, silica powder, pulp, cut fibers, a neutralizing agent such as sodium carbonate, powdered pigments, cloth, etc. will produce a microporous material excellent in uniformity and permeability, and formation of micropores in this case is generally simple and the diameter of the micropore can be made slightly larger. The reason is that while a solution of synthetic resin tends to coagulate, shrink, and reduce the diameter of micropore upon the volatilization of volatile matter contained in the solution, the solid additives of the type described above weaken such inclination thereby making it possible to keep micropores of comparatively large diameter as they were when they existed in the dispersion of non-solvent.

When the mixture of the kind described is used, the resin in process of volatilization increases in concentration generally on the volatilizing surface and tends to produce a uniform microporous layer on the surface rather than inside the mixture, and consequently when the solid additives mentioned above are added, the effect of the additives is prominently increased in such a manner that the resin in its inside layer is so low and on its surface is so high in concentration that a fine appearance is produced with no pore visible at a glance.

When the mixture is used with resin concentration reduced without non-solvent being added but with fillers added such as carbon powder, a porous material having a certain degree of permeability can be obtained. But this is due to porosity inherent in the carbon powder itself, and is not always successful but on the contrary it is generally the case that the mixture is coated on the surface with resin film and no micropores are produced. It is much less possible to obtain a microporous layer which is high in resin concentration in the surface layer alone. A material containing a known bubbling matter may be used for the formation of gas permeable pores and in this case resinous beads can be used instead of liquid, but as heat is applied to the beads, the cell cover must be made heat-resistant, and the pores produced also become large in diameter at a small sacrifice of an outside appearance of the battery.

A liquid mixture used by the method of the invention is so high in fluidity that it presents highly efficient workability. Particularly it is advantageous in that pouring of the mixture direct into the exhaust portion and subsequent volatilization of volatile matter contained in the mixture can provide a microporous material and that in consequence the formation of micropores is simple and the use of the mixture containing a solvent can produce an adhesive effect which is useful for making the microporous material an integral part of the circumference of the exhaust portion formed on the cell cover. The micropores thus formed are less than several microns in diameter and are provided in the form of a good-looking microporous matter with exact uniformity in microporosity. A different step may be intrduced in the employment of this method in such a way that instead of the mixture being dried immediately after it is poured into the exhaust portion, the mixture poured may be dipped in a non-solvent such as water, alcohol, etc. and then dried. Through this step of dipping, the contraction of the resin contained in the mixture is moderated and permeability is improved.

Another method of forming a container and a microporous material integrally is to place a microporous material beforehand prepared on the exhaust portion of the cell cover and to join a contact portion between the cover plate and the microporous material to the exhaust portion with a suitable adhesive 17 (FIG. 5) or by welding. This method makes it necessary to provide beforehand a ready-made microporous material of uniform size and involves a more complicated step of process but it offers an advantage in that a microporous material of relatively stabilized quality can be obtained and the formation of the microporous material into a thinner plate is facilitated.

It gives an attractive appearance and an impression of a leak-proof battery that this invention is embodied in such a way that the cell cover and the microporous material provided on the exhaust portion are formed into an integral whole. The diameter of the micropores of the portion appearing on the surface of the cell cover is preferably so small as the eye cannot perceive, for example, a diameter of less than several ten microns is suitable. The microporous material is preferably water-repellent.

Although the microporous material described above is sufficiently small in the diameter of micropore, still there is a possibility of droplets of acid leaking. For instance, when spray or mist of acid and alkali is increased because of a very short time charge, the microporous material is wetted all over the surface and the resulting increase of the pressure inside the battery entails danger of the acid or the alkali being leaked. If possible, an electrolyte absorber is preferably provided below the microporous material so as to roughly absorb large drops of electrolyte. As the amount of electrolyte is apparent at the time of designing a battery, the maximum value of electrochemical water decomposition due to overcharging can be calculated, and the resulting amount of spray or mist can be also calculated. The substance which can fully absorb this amount of spray or mist may be placed below the microporous material for the prevention of leakage. In the case of a lead acid battery, a neutralizer is effectively used as an absorber. An experiment made with the battery containing twice as much sodium carbonate as the calculated amount of spray or mist showed that charging continued until there was no electrolyte left within the battery caused no leakage of spray or mist outside the battery.

It is a more effective step that in order to further reduce the amount of spray or mist coming into the microporous material, a valve is provided on the way through which the spray or mist comes in or an opening through which it comes in may be made smaller and a means is provided by which the valve opens only when the pressure inside the battery is raised higher than a predetermined value.

Incidentally the fact that the revealed surface portion of the microporous material is made larger than the port through which spray or mist comes in helps keep the exhaust portion always dry and is effective for good functioning of the exhaust portion. Furthermore, the electrolyte is preferably fixed so that the amount of spray or mist may be reduced and the electrolyte may not leak when the battery is turned sideways or upside down. As the method of fixing the electrolyte such a known method may be employed as that by which the electrolyte is changed into colloidal form or a porous sheet, but in the case of the semi-sealed type storage battery of the invention in which no refilling of electrolyte is necessary, it is desirable that the decrease of electrolyte brought about by electrochemical water decomposition due to overcharge should not reduce capacity. For this purpose it is desirable that even if decreased in the amount of water, an electrolyte conducive to an electromotive reaction should always fill the space between the plates. Consequently the arrangement of the porous material in such a manner that the density of pores is higher between the plates than around the electrode group and that because of water decrease the electrolyte around the porous material can get together in the porous material filling the space between the plates by capillary action is more desirable than the arrangement in which the density of pores is uniform. As materials which meet the requirement the use of an elastic porous material such as a glass mat, synthetic non-woven fiber mat, etc. is effective for producing difference in the density of pore more easily between and around the electrode plates.

Because the semi-sealed type storage battery of the invention needs no refilling of electrolyte, the content of the maximum amount of active material is desirable. In this sense the use of a thick separator is not suitable. A microporous separator formed of elastic synthetic resin with a thickness of about 0.05–0.2 mm. is suitable. Wrapping a plate in the microporous separator of the kind which was formed into a porous envelope shape by heat sealing is effective for the prevention of short circuit ascribable to the falling-off of active material especially in the case of a lead acid battery, and not only the omission of provision of a bridge in the lower portion of the container and the production of a compact and light weight battery are made possible but also the electrolyte which has been heretofore provided on this portion and which is useless herein can be dispensed with. Furthermore, such wrapping both electrodes in the microporous separator makes it possible for the gas produced by electrochemical water decomposition in time of charging to rise through a very small space between the microporous separator and the plates. This can remove the cause for leakage of electrolyte attributable to a rise in the surface level of the electrolyte resulting from flow of gas into the porous material or colloidal matter between the plates and stay of the gas therein.

In the semi-sealed type storage battery of the invention in which no refilling of liquid is needed, the method described above is chiefly intended to explain how to retain as much active electrolyte as possible, and a method of preventing the active electrolyte from disappearing from the battery in the form of evaporation or gas due to electrochemical water decomposition is, on the other hand, very important. In this respect too, this invention has an ingenious device which forms another feature of the invention. The use in single or in combination of the following four methods provides an improved effect.

(1) Provision of a pressure valve. It is normally closed, preventing the evaporation of the electrolyte when the battery is not in use, and opens only when the pressure inside the battery is increased.

(2) As is especially important in the case of a lead acid battery, the presence of heavy metal of low hydrogen overvoltage in the battery produces a hydrogen gas due to self-discharge to which an active material is subject while the battery is left unused. For the prevention of this phenomenon, metals of low hydrogen overvoltage such as antimony, nickel, etc. should not be incorporated into a battery grid but pure lead or a lead alloy containing other non-affecting metals such as cadmium, calcium, etc. is used. This method has an advantage for further improving charge efficiency. A lead acid battery in which an antimony alloy is used has a low hydrogen overvoltage, and in consequence, before the active material is charged in time of charging and regenerated, a hydrogen gas is produced and voltage is not raised, and hence a charge rate becomes lower than a discharge rate and charge efficiency is reduced. But by the introduction of the method described above, the battery voltage is raised without a hydrogen gas being produced, and increased charge efficiency and reduced rate of overcharge are attained. This means that the decrease of electrolyte due to electrochemical water decomposition effected by overcharge is reduced. The fact is very important for the provision of a storage battery of the type in which refilling of liquid is not necessary.

(3) This is a method by which a large current is consumed at the initial stage of charging in order to improve charge efficiency and to reduce overcharge but a very small current is consumed at the final stage of charging. According to the method, a charge current is caused to decrease through the voltage that is raised at the closing stage of charging of the battery. A constant-potential charge system in which a charge current is decreased in proportion to an increase of the voltage, and a bypass circuit in which Zener diode is used for reducing or cutting off a charge current when the battery voltage reaches the predetermined voltage are applied.

(4) This is a method by which to provide a gas consuming device to consume the gas produced in time of charging and to prevent it from flowing out of the battery. According to the method, an oxygen gas is electrochemically ionized, that is to say, part of the carbon or silver electrode (in the case of a lead acid battery) or the nickel or silver electrode (in the case of an alkaline battery) is dipped in an electrolyte, another part thereof is exposed in the space inside the battery and still another part thereof is connected through a conductor to the negative electrode, thereby to obtain electron from the negative electrode and to consume an oxygen gas in an ionized form. This is a known method in the case of a completely sealed battery. But according to this known method, the negative electrode capacity must be made surplus capacity in order to prevent a hydrogen gas from being produced inside the battery, with the resulting disadvantage that the volume efficiency and weight efficiency of the battery are reduced, gas-tightness must be ensured for the maintenance of the surplus capacity, and an electrode of high consumption ability is very high in price. And on the other hand, when the method is applied to an open type battery, it has another disadvantage that the battery is discharged because it consumes oxygen in the air.

All the drawbacks of the kind described above, however, have been eliminated by the semi-sealed type storage battery of the invention, in which communication is made with the air through a hole or a valve, and in which charge is carried out in such a manner that current is reduced to a very small amount at the final stage of charging and that the provision of a gas consuming electrode to consume said reduced amount of current will suffice the purpose of charging. This is another feature of the invention. According to the invention, the gas produced by overcharge carried out by a very small current at the final stage of charging is almost completely reduced to water and communication is made through a hole or a valve, and in consequence there is no possibility of explosion owing to an increase of inside pressure. The invention has the advantage that the use of a gas consuming electrode of poor ability and inferior quality could answer the purpose.

According to the method there is no possibility of self-discharge being effected through the consumption of an oxygen gas in the air while the battery is left unused so long as there is provided a valve which opens in accordance with an increase of inside pressure, and consequently the gas consuming electrode may be left connected at all times to the negative electrode, but in case free communication with the air is made, the self-discharge can be prevented by differently arranging charging terminals and discharging terminals, so that the gas consuming electrode and the negative electrode are connected with each other only when the battery is charged. And the surplus capacity of the negative electrode is necessarily obtained by the discharge from the gas consuming electrode effected from the time when charging is commenced till the time when the battery voltage is raised in proportion as the battery is charged. According to the method, when an oxygen gas is produced during overcharge, the carbon electrode or the nickel electrode connected to the negative electrode ionizes an oxygen, discharges negative ion and supresses the generation of a hydrogen gas, and prevents overflow of gas outside the battery and decrease of electrolyte.

Figure 7:
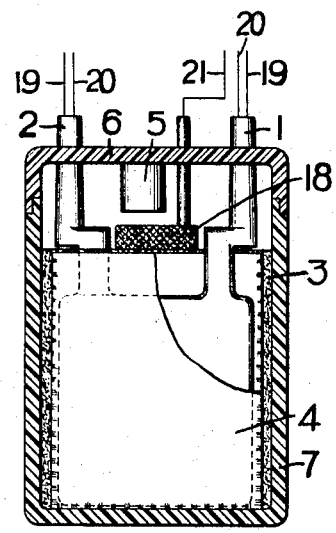
FIG. 7 is a longitudinal sectional view of a semi-sealed type storage battery on the inside of which an auxiliary gas consuming electrode is provided.
Figure 8:
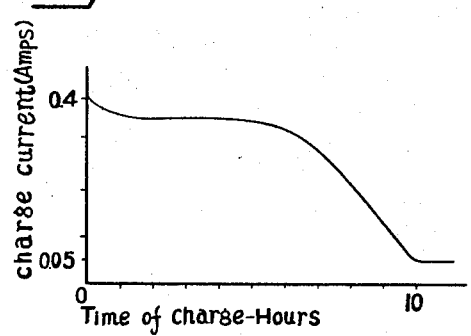
FIGS. 8 and 9 are diagrams illustrating a charging curve and charging circuit respectively.
Figure 9:
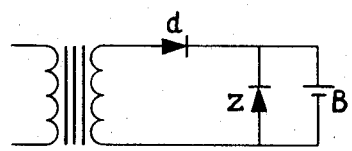
Figure 10:
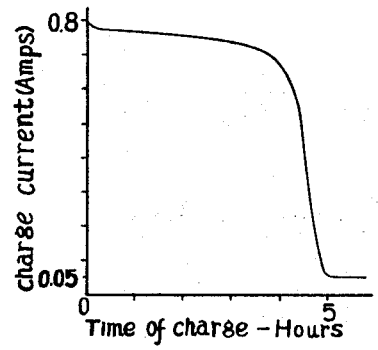
FIGS. 10 and 11 show further modifications of the invention.
Figure 11:
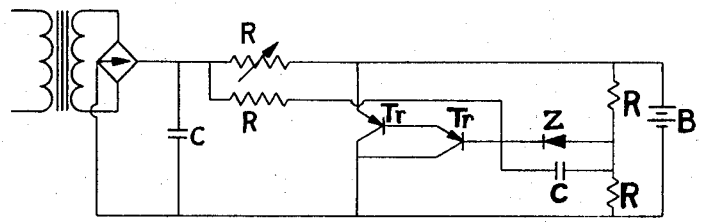

In explanation of the above, FIGS. 7–11 are shown. FIG. 7 is a modification of the invention in which are shown placed both negative and positive electrodes having discharging terminals 19—19 and charging terminals 20—20 in the battery and provided a gas consuming electrode 18 having a terminal 21, and in which is shown the terminal 21 of the gas consuming electrode 18 connected to a charging terminal 20 for the negative electrode shown in the left side of FIG. 7 and charged. FIG. 8 illustrates a charging characteristic curve, in which an axis of ordinate represents a charge current A and an axis of abscissa represents a charge hour $t$. As apparent from the diagram, a comparatively large current flows at the initial stage of charging, but a smaller current at the final stage. FIG. 9 illustrates an electric circuit applied to the charging curve shown in FIG. 8. FIG. 11 illustrates another electric circuit applied to the charging curve shown in FIG. 10. In FIGS. 9 and 11, $d$ indicates diode; Z indicates Zener diode; R, resistance; $Tr$, a transistor; C, a condenser; and B indicates a semi-sealed type storage battery according to the invention.

As described above, the semi-sealed type storage battery of the invention has substantially the same uniform ability as the sealed type storage battery and can find application in the manufacture of all types of battery such as a lead acid battery, a Ni-Cd battery, an Ag-zn battery, with no danger involved and at reduced cost. The invention can be effectively applied especially to various portable electric packaged power devices and vehicle batteries.

It is to be understood that various changes and modifications could be made without departing from the scope and spirit of the invention. For example, when a plate containing antimony or nickel which reduces hydrogen overvoltage is used, the surface of the plate can be plated with lead.

What is claimed is:

1. A semi-sealed non-refillable type storage battery comprising a plastic container containing negative and positive plates, separators, an electrolyte and an oxygen gas-consuming electrode part of which is in contact with the electrolyte, another part of which is exposed in the space inside the battery above said electrolyte and still another part of which is connected to the negative plates, said container having no inlet port for refillable liquid but having an exhaust port in one wall thereof, said exhaust port containing a microporous synthetic resin material to permit exhaust gas to pass therethrough but prevent passage of said electrolyte, said microporous material being integral with and in the same plane as said wall, a valve located on the internal side of said microporous material said valve being normally closed but capable of opening only in response to an increase in gas pressure within said battery, said separators covering each of said plates and comprising a synthetic resin microporous material having a thickness between about 0.05 and 0.2 mm. and a porous material of good liquid-retaining ability filling the space between said covered plates and around said covered plates, the distribution density of pores in the material between said covered plates being higher than the distribution density of pores in said material surrounding said covered plates whereby the space between the covered plates is replenished with electrolyte drawn into said space by capillary action.

2. A semi-sealed type storage battery as claimed in claim 1 further comprising a neutralizing agent located between said valve and said microporous material within said container for consuming electrolyte spray and mist.

3. A semi-sealed type storage battery as claimed in claim 1 wherein said valve comprises a cylindrical member closed at one end and having at least one hole in the cylindrical wall thereof and an elastic member sitting snuggly around said cylindrical member and over said hole such that gas under pressure will pass through said hole in the wall of said cylindrical member expanding said elastic member to release said gas pressure.

References Cited

UNITED STATES PATENTS

| | | | |
|---|---|---|---|
| 1,486,430 | 3/1942 | Hansen | 136—144 |
| 2,437,145 | 3/1948 | Woodbridge | 136—177.2 |
| 2,542,527 | 2/1951 | Honey et al. | 136—144 |
| 2,578,027 | 12/1951 | Tichenor | 136—6 |
| 2,790,570 | 4/1957 | Hodges et al. | 136—178 |
| 2,926,211 | 2/1960 | Sturges | 136—177 |
| 2,928,889 | 3/1960 | Bonner et al. | 136—24 |
| 3,096,216 | 7/1963 | Warren | 136—6 |
| 3,282,740 | 11/1966 | Wylie | 136—177 |
| 3,351,497 | 11/1967 | Lucas | 136—178 |
| 1,452,806 | 4/1923 | Hopkins | 136—179 XR |
| 1,583,648 | 5/1926 | Benner | 136—179 |
| 2,394,333 | 2/1946 | Schneider | 136—179 |
| 2,104,973 | 1/1938 | Dassler | 136—179 |
| 2,317,711 | 4/1943 | Andre | 136—179 XR |
| 3,080,440 | 3/1963 | Ruetschi et al. | 136—3 |
| 3,159,508 | 12/1964 | Chreitzberg | 136—166 |
| 3,360,403 | 12/1967 | Halsall | 136—170 |

FOREIGN PATENTS

| | | |
|---|---|---|
| 466 | 11/1900 | Great Britain. |
| 560,087 | 6/1923 | France. |
| 877,785 | 5/1953 | Germany. |

WINSTON A. DOUGLAS, Primary Examiner

ANTHONY SKAPARS, Assistant Examiner

U.S. Cl. X.R.

136—178, 179, 145